US006248837B1

(12) United States Patent
Chung et al.

(10) Patent No.: US 6,248,837 B1
(45) Date of Patent: Jun. 19, 2001

(54) PROCESS FOR PREPARING POLYOLEFIN DIBLOCK COPOLYMERS INVOLVING BORANE CHAIN TRANSFER REACTION IN TRANSITION METAL-MEDIATED OLEFIN POLYMERIZATION

(75) Inventors: Tze-Chiang Chung; Guangxue Xu, both of State College, PA (US)

(73) Assignee: The Penn State Research Foundation, University Park, PA (US)

( * ) Notice: Subject to any disclaimer, the term of this patent is extended or adjusted under 35 U.S.C. 154(b) by 0 days.

(21) Appl. No.: 09/359,329

(22) Filed: Jul. 21, 1999

Related U.S. Application Data

(60) Continuation-in-part of application No. 08/992,167, filed on Dec. 17, 1997, now abandoned, which is a division of application No. 08/680,095, filed on Jul. 15, 1996, now abandoned.

(51) Int. Cl.$^7$ .......................... C08F 293/00; C08F 295/00
(52) U.S. Cl. ........................... 525/245; 525/248; 525/251
(58) Field of Search ................................. 525/245, 248, 525/251

(56) References Cited

U.S. PATENT DOCUMENTS

| | | |
|---|---|---|
| 3,265,765 | 8/1966 | Holden, et al. . |
| 3,734,978 | * 5/1973 | Schwab et al. . |
| 3,887,650 | * 6/1975 | Agouri et al. . |
| 4,174,358 | 11/1979 | Agouri, et al. . |
| 4,299,931 | 11/1981 | Coran, et al ............................ 525/95 |
| 4,530,914 | 7/1985 | Ewen, et al. ........................ 501/113 |
| 4,542,199 | 9/1985 | Kaminsky, et al. .................. 526/160 |
| 4,665,047 | 5/1987 | Slaugh, et al. ...................... 502/108 |
| 4,734,472 | 3/1988 | Chun .................................... 526/239 |
| 4,751,276 | 6/1988 | Chung ................................. 526/158 |
| 4,752,597 | 6/1988 | Turner ................................. 502/104 |
| 4,812,529 | 3/1989 | Chung ............................... 525/326.1 |
| 4,877,846 | 10/1989 | Chung ................................. 525/369 |
| 4,946,899 | 8/1990 | Kennedy, et al. .................... 525/244 |
| 5,026,798 | 6/1991 | Canich ................................ 526/127 |
| 5,272,236 | 12/1993 | Lai, et al. ......................... 526/348.5 |
| 5,286,800 | 2/1994 | Chung, et al. ....................... 525/288 |
| 5,401,805 | * 3/1995 | Chung et al. ........................ 525/288 |
| 5,543,484 | 8/1996 | Chung, et al. ..................... 526/347.1 |
| 5,703,187 | 12/1997 | Timmrs ............................... 526/282 |
| 5,798,420 | * 8/1998 | Cozewith et al. . |
| 5,840,808 | * 11/1998 | Sugimura et al. ................... 525/268 |
| 5,866,659 | 2/1999 | Chung, et al. ....................... 525/279 |

OTHER PUBLICATIONS

Muelhaupt et al., Functional Polypropylene Blend Compatibilizers, Makromol. Chem. Macromol. Symp. 48/49 317–332, 1990.*
Chung, "Recent Developments in the Functionalization of Polyolefins Utilizing Borane–Containing Copolymers", Trends Polym. Sci. 3(6), p. 191–8, 1995.*
Chung et al. "Metallocene Catlysts and Borane Reagents in the Bock/Graft Reactions of Polyolefins", Polym. Mater. Sci. Eng. 73, 463–4, 1995.*
Chung, "Borane Containing Polymers: The Versatile Intermediates", Polym. News 18(2), 38–43, 1990.*
Koo, et al., Macromolecules, vol. 32, pp. 981–988 (1999).
Fu, et al., J. Am. Chem. Soc., vol. 117, pp. 10747–10748 (1995).
Koo, et al., J. Am. Chem. Soc., vol. 120, pp. 4019–4020 (1998).
Mulhaupt, et al., Polymers for Advanced technologies, vol. 4, pp. 439–449 (1993).
Chung, et al., Polymer, vol. 38, No. 6, pp. 1495–1502 (1997).
Lu, et al., Macromolecules, vol. 31, No. 17, pp. 5943–5946 (1998).
Lu, et al., Macromolecules, vol. 32, No. 8, pp. 2525–2533 (1999).
Chung, et al., Macromolecules, vol. 26, No. 14, pp. 3467–3471 (1993).
Cohen, et al., Macromolecules, vol. 15, pp. 370–375 (1982).
Yasuda, et al., Macromolecules, vol. 25, pp. 5115–5116 (1992).
Drzewinski, et al., J. Polym. Sci., Part A: Polym. Chem., vol. 24, pp. 2457–2466 (1986).
Mulhaupt, et al., Makromol. Chem.m Macromol. Symp., vol.48/49, pp. 317–332 (1991).
Doi, et al., Advanced Polym. Sci., vol. 73/74, pp. 201–248 (1989).
Chung, et al., Macromolecules, vol. 27, No. 6, pp. 1313–1319 (1994).
Cohen, et al., Macromolecules, vol. 12, No. 1, pp. 131–134. (19790
NOTES, J. Polym. Sci.: Polym. Phys. Ed., vol. 18, pp. 2143–2148 (1980).
Cannizzo, et al., Macromolecules, vol. 21, pp. 1961–1967 (1988).
Doi, et al., Makromol. Chem., vol. 186, pp. 11–15 (1985).

* cited by examiner

Primary Examiner—Jeffrey C. Mullis
(74) Attorney, Agent, or Firm—Thomas J. Monahan

(57) ABSTRACT

Polyolefin diblock copolymers are prepared via a chain transfer reaction with a borane dimer compound during a transition metal-catalyzed olefin polymerization in a process that resembles a transformation from transition metal coordination polymerization to free radical polymerization via a borane end group. The polyolefin diblock copolymers may be represented by the following formula:

(Transition Metal Prepared Polyolefin)-b-(Free Radical Prepared Polymer), wherein the polyolefin segment is a homo-, co- and ter-polymer prepared by transition metal (especially metallocene catalyst) coordination polymerization of at least one olefin, and the free radical prepared polymer segment is prepared by free radical polymerization of at least one vinyl monomer, such as styrene, maleic anhydride, acrylates, methacrylates and their mixtures. The resulting diblock copolymers are useful as the interfacial materials to improve the interaction between polyolefins and other materials.

22 Claims, No Drawings

PROCESS FOR PREPARING POLYOLEFIN DIBLOCK COPOLYMERS INVOLVING BORANE CHAIN TRANSFER REACTION IN TRANSITION METAL-MEDIATED OLEFIN POLYMERIZATION

RELATED APPLICATIONS

This application is a continuation-in-part of Ser. No. 08/992,167, filed Dec. 17, 1997, now abandoned which is a division of Ser. No. 08/680,095, filed Jul. 15, 1996 now abandoned.

FIELD OF THE INVENTION

This invention relates to a process for preparing polyolefin diblock copolymers comprising a polyolefin segment prepared by transition metal catalysis, preferably metallocene catalysis, and a free radical prepared polymer segment. The process involves a borane chain transfer reaction during transition metal mediated olefin polymerization to produce a polyolefin having a terminal borane group which serves as the agent for transforming transition metal coordination polymerization to free radical polymerization.

BACKGROUND OF THE INVENTION

Although useful in many commercial applications, polyolefins suffer a major deficiency, i.e., poor interaction with other materials. The inert nature of polyolefins significantly limits their end uses, particularly, those in which adhesion, dyeability, paintability, printability or compatibility with other functional polymers is paramount. The poor compatibility of polyolefins is further evidenced in their use as coatings where weak adhesion between polyolefin and metal surface has not allowed the use of this material for the protection of metal. Furthermore, attempts to blend polyolefins with other polymers have been unsuccessful for much the same reasons, i.e., the incompatibility of two polymers.

In general, polyolefins, such as polyethylene and polypropylene, have been among the most difficult materials to chemically modify. For example, in direct polymerization reactions using early transition metal catalysts, it normally is difficult to incorporate functional group-containing monomers into olefin polymers due to catalyst poisoning by functional groups. (See J. Boor, Jr., *Ziegler-Natta Catalysts and Polymerizations*; Academic Press: New York, 1979). Similarly, in the post-polymerization reactions, the inert nature and crystallinity of the olefin polymers usually makes it very difficult to chemically modify the polymers under mild reaction conditions. In many cases, the reactions involve serious side reactions, such as crosslinking and degradation. Accordingly, it is clear that there is a fundamental need to develop a new chemistry which can address these problems.

In previous patents (U.S. Pat. Nos. 4,734,472; 4,751,276; 4,812,529; 4,877,846), there has been a systematic investigation of borane-containing polyolefins. The chemistry disclosed in those patents involves a direct polymerization using organoborane-substituted monomers and alpha-olefin monomers in Ziegler-Natta processes. The homo- and copolymers formed in accordance with the processes of those patents contain borane groups and are useful intermediates for preparing a series of functionalized polyolefins. Many new functionalized polyolefins with various molecular architectures have been obtained based on the chemistry that is disclosed in those patents. Moreover, it has been demonstrated that the addition of polar groups to polyolefins can improve the adhesion of polyolefins to many substrates, such as metals and glass. (See, Chung et al, *J. Thermoplastic Composite Materials* 6, 18, 1993). The chemistry of borane containing polymers has also been extended to the preparation of polyolefin graft copolymers, which involves a free radical graft-from reaction (See U. S. Pat. Nos. 5,286,800 and 5,401,805), and it has been shown that in polymer blends, the compatibility of the polymers can be improved by adding a suitable polyolefin graft copolymer which reduces the domain sizes and increases the interaction between domains (See Chung et al, *Macromolecules* 26, 3467, 1993; *Macromolecules*, 27, 1313, 1994).

Diblock copolymers are an interesting class of materials, which exhibit some useful combinations of physical properties. The applications of diblock copolymers as compatibilizers are particularly useful in polymer blends (See U.S. Pat. No. 4,299,931; Cohen, et al, *Macromolecules* 15, 370, 1982; *Macromolecules* 12, 131, 1979; *J. Polym. Sci., Polym Phys.* 18, 2148, 1980; and U.S. Pat. No. 4,174,358). The incompatible polymers can be improved by adding a suitable compatibilizer which alters the morphology of these blends as well as interfacial adhesion between domains.

In chemistry, most diblock copolymers have been produced by sequential living polymerization processes, namely anionic (See U. S. Pat. No. 3,265,765), cationic (See U.S. Pat. No. 4,946,899) and metathesis (See R. H. Grubbs, et al, *Macromolecules* 21, 1961, 1988) living polymerizations. However, living polymerization processes are limited to a relatively small number of monomers which undergo living propagation, and are limited further by difficulties in the crossover reaction from one monomer to the other. The extension of sequential living polymerization to transition metal coordination polymerization for preparing polyolefin diblock copolymers has been very limited. Only a few cases have been reported under very inconvenient reaction conditions and with special catalysts (See Y. Doi, et al, *Makromol. Chem.* 186, 11, 1985; *Adv. Polym Sci.*, 73/74, 201, 1989 and H. Yasuda, et al, *Macromolecules*, 25, 5115, 1992). Other methods of prepareing polyolefin diblock copolymers involve a transformation reaction from anionic to Ziegler-Natta polymerization, (See R. E Cohen, *J. Polym. Sci.*: Part A: *Polym. Chem.* 24, 2457, 1986) or from Ziegler-Natta to free radical vinyl polymerization (See U.S. Pat. No. 3,887, 650), and a coupling reaction (See R. Mulhaupt et al, *Makromol. Chem., Macromol. Symp.* 48/49, 317, 1991). In general, the product of such a coupling reaction most likely is an intimate mixture of homopolymers and perhaps some block copolymer; and based on measured lifetimes of the growing chains and efficiency of the coupling reaction, the yields of polyolefin diblock copolymers are well below 20%.

Recently, a method of preparing polypropylene diblock copolymers from vinylidene-terminated polypropylene has been reported (See Chung et al, *Macromolecules* 32, 2525, 1999; *Macromolecules* 31, 5943, 1998; *Polymer* 38, 1495, 1997; and Mulhaupt et al, *Polymers for Advanced Technologies*, 4, 439, 1993). The vinylidene-terminated polypropylene, also referred to as chain end unsaturated polypropylene, can be prepared by metallocene polymerization or thermal degradation of high molecular weight polypropylene (PP). The overall diblock copolymer chemistry involves a multiple-step chain extension process which is started with a functionalization reaction of the vinylidene group at the PP chain end. The formed terminal functional group is then used as the active site for coupling reactions or chain extension reactions, such as free radical and ringopening polymerizations, to produce PP diblock copolymers. Overall, the effectiveness of this chain extension process is strongly dependent on (a) the percentage of polymer chains having a vinylidene terminal group and (b) the efficiency of functionalization reaction. It is obvious that the efficiency of functionalization reaction reduces with an increase of PP molecular weight, due to the reduced vinylidene concentration. Some functionalization reactions are very effective for low molecular weight PP. However, they become very difficult for PP polymers having a molecular weight higher than about 30,000 g/mole. Unfortunately, for many applications, the use of high molecular weight PP is essential. For example, for improving the interfacial interactions in PP blends and composites, it is essential that the PP have a high molecular weight. In addition, the availability of chain-end unsaturated polyolefin is very limited. Most polyolefins, except polypropylene, have only a low percentage of chain-end unsaturation in their polymer chains.

In general, developments in metallocene homogeneous catalysis have provided a new era in polyolefin synthesis (See, for example, U.S. Pat. Nos. 4,542,199, 4,530,914, 4,665,047, 4,752,597, 5,026,798 and 5,272,236). With well-designed (single-site) catalyst systems, monomer insertion can be greatly enhanced. This is especially important for copolymerization reactions involving high alpha-olefins and styrenic monomers. In this latter regard, it has been disclosed to use metallocene catalysts having a constrained ligand geometry for producing linear low density polyethylene (LLDPE), poly(ethylene-co-styrene) (U.S. Pat. No. 5,703,187), poly(ethylene-co-p-methylstyrene ), poly (ethylene-ter-propylene-ter-p-methylstyrene) and poly (ethylene-ter-1-octene-ter-p-methylstyrene) (U.S. Pat. Nos. 5,543,484 and 5,866,659), with narrow molecular weight and composition distributions. The relatively opened active site in a catalyst with constrained ligand geometry facilitates the incorporation of relatively large amounts of high olefinic monomers in olefin copolymers. In general, the incorporation of high alpha-olefins is significantly higher when using opened active site catalysts having constrained ligand geometry than when using traditional Ziegler-Natta catalysts. In several publications, the experimental results also show that effective chain transfer reaction can take place with hydrogen and silane in some metallocene polymerization reactions. Several organosilanes having Si—H groups are effective chain transfer agents in metallocene-mediated polymerizations that result in silane-terminated polyolefins and copolymers (See Marks, *J. Am. Chem. Soc.* 1998, 120, 4019; *J. Am. Chem. Soc.* 1995, 117, 10747; *Macromolecules* 1999, 32, 981).

SUMMARY OF THE INVENTION

In this invention, a convenient and generally-applicable process is disclosed for preparing polyolefin diblock copolymers, containing a transition metal prepared polyolefin segment and a free radical prepared polymer segment. The process is based on an in situ chain transfer reaction involving a B—H moiety in a borane dimer compound during a transition metal-catalyzed olefin polymerization. Under olefin polymerization reaction conditions that avoid undesirable side reactions, a borane-terminated polyolefin can be prepared effectively with a molecular weight inversely proportional to the molar ratio of [borane]/[alpha-olefin]. The borane terminal group serves as a transformation agent, changing a transition metal coordination active site to a living free radical site, which initiates a second polymerization of various free radical polymerizable monomers to produce diblock copolymers. The general reaction scheme is illustrated below.

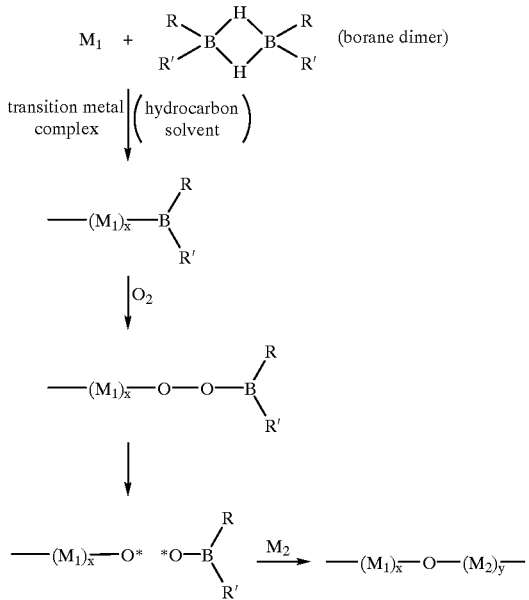

wherein, R and R' are the same or different linear or branched alkyl or cycloalkyl groups having from 1 to 15 carbon atoms or where R and R' together form a cyclic structure, such as where the borane dimer is the dimer of 9-BBN (9-borabicyclononane). $M_1$ represents an olefin monomer. Suitable olefin monomers include $C_2$–$C_{18}$ monomers having a linear, branched or cyclic structure. Examples of olefin monomers ($M_1$) that may be used in the practice of this invention include, ethylene, propylene, 1-butene, 1-pentene, 1-hexene, 1-octene, 3-methyl-1-butene, 4-methyl-1-pentene, cyclopentene, norbornene, phenylnorbornene, indanylnorbornene, styrene, p-methylstyrene, 1,4-hexadiene, 1,5-hexadiene, vinylidenenorborene, divinylbenzene and the like. These monomers can be used either singly or as a mixture of two or more such monomers. $M_2$ represents free radical polymerizable vinyl monomers, including, for example, methyl methacrylate, ethyl methacrylate, butyl methacrylate, octyl methacylate, methacrylic acid, methyl acrylate, ethyl acrylate, butyl acrylate, octyl acylate, 2-hydroxyethyl acrylate, glycidyl acrylate, acrylic acid, maleic anhydride, vinyl acetate, acrylonitrile, acrylamide, vinyl chloride, vinyl fluoride, tertrafluoroethylene, styrene, alpha-methyl styrene, trimethoxyvinylsilane, triethoxyvinylsilane and the like. These radical polymerizable monomers can be used either singly or as a mixture of two or more such monomers. The subscripts x and y represent the number of repeating monomer units in each segment, with x being between 10 and 100,000, preferably between 20 and 30,000, and most preferably between 50 and 10,000, and y being between 1 and 100,000, preferably between 1 and 10,000, and most preferably between 1 and 5,000.

The success of an in situ chain transfer reaction using the B—H moiety in a borane compound during a transition metal-catalyzed olefin polymerization is governed by an ability to control undesirable side reactions, namely a hydroboration reaction between the B—H moiety and the olefin monomer(s), and a ligand exchange reaction between the borane chain transfer agent and the co-catalyst. Thus, it has been found to be essential to the sucessful performance of the presence process (1) to use a borane chain transfer agent that forms a stable dimer structure (inert to olefin monomers) in hydrocarbon media, and (2) to use a co-catalyst that does not undergo a ligand exchange with the borane chain transfer agent. With regard to requirement (1), it has been found necessary (in the case of solution and dispersion polymerizations) to use a hydrocarbon solvent, such as hexane, heptane, cyclohexane, xylene, toluene or the like, to maintain the borane compound in a stable dimer form; and with regard to requirement (2), it has been found necessary to limit the transition metal coordination catalyst to an active ionic complex having an active transition metal cationic coordination site and a non-coordinating, compatible anion, such as tetra(pentafluorophenyl)borate, methyltri(pentafluorophenyl)borate, tetraphenylborate or the like to prevent ligand exchange reaction between the borane chain transfer agent and the co-catalyst.

The polyolefin diblock copolymers of this invention are useful as interface modifiers, such as compatibilizers in polyolefin blends and composites. When used in polymer blends, the polyolefin diblock copolymers serve as an emulsifier to alter the morphology of the blends. More particularly, the polyolefin diblock copolymers successfully reduce the domain sizes for the polymers in the blend and increase the interaction at the interface between adjacent domains. In polyolefin composites, a polyolefin diblock copolymer located at the interface can provide good adhesion between polyolefin and fillers.

DETAILED DESCRIPTION

In accordance with the present invention, polyolefin diblock copolymers are prepared under generally conventional transition metal catalyzed polymerization reaction conditions by polymerizing one or more olefins in the presence of a stable organoborane dimer compound having a reactive B—H group, and in the further presence of a transition metal catalyst/co-catalyst system having a co-catalyst of non-coordinated anion nature. When prepared in accordance with the process of this invention, a borane-terminated polyolefin is first formed using the stable organoborane dimer compound as a chain transfer agent; whereafter, the borane-terminated polyolefin is selectively oxidized in situ and transformed to a stable polymeric radical for the polymerization of free radical polymerizable monomers.

The process of this invention is based, at least in part, on the discoveries that during a transition metal catalyzed polymerization of olefin monomer(s), and preferrably a metallocene catalyzed polymerization, a borane dimer compound having a B—H group will not undergo a hydroboration reaction with the olefin monomer(s), and that a co-catalyst having a non-coordinated anion nature, such as $[MeB(C_6F_5)_3]^-$ and $[B(C_6F_5)_4]^-$, will not undergo a ligand exchange reaction with the borane dimer. Thus, with the elimination of two major side reactions, the borane dimer compound can engage in a chain transfer reaction to form a borane-terminated polyolefin.

The borane chain transfer reaction can be applied to many olefin monomers and transition metal coordination catalysts to prepare a whole range of borane-terminated polyolefins. If the specific reaction conditions are met to avoid the undesirable side reactions, namely the hydroboration of the B—H group and a ligand exchange reaction between the borane and co-catalyst, as discussed hereinabove, the molecular weight of the borane-terminated polyolefin is basically controlled by the mole ratio of [monomer]/[borane].

Transition metal coordination catalysts capable of an olefin polymerization-chain transfer reaction comprise active ionic complexes shown in the following formula:

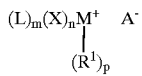

where L is a ligand, such cyclopentadienyl, substituted cyclopentadienyl (e.g., pentamethylcyclopentadienyl, indenyl, methylindenyl, fluorenyl or the like) amido, phosphido, bulky alpha-diimine group, or a bridged ligand having a covalent bridging group (such as silane, methyl and dimethyl groups) between two ligands; X is a halogen; $R^1$ is a hydrocarbyl group or hydrocarboxy group having from 1 to 20 carbon atoms; and m=1–3, n=0–2, and p=1–2. M is a transition metal of groups IIIB to VIIB and VIII of the Periodic Table. Particularly desirable are metallocene complexes of a Group IVB and VB metal, such as titanium, zirconium and hafnium. $A^-$ is a non-coordinating, compatible anion. Particularly desirable non-coordinating anions include borates, such as tetraphenylborate, tetrakis(pentafluorophenyl)borate, and methyltri(pentafluorophenyl)borate. One known method of making the ionic catalyst species useful in this invention involves combining (a) a transition metal compound of the groups IIIB to VIIB and VIII of the Periodic Table and (b) a compound capable of reacting with a transition metal compound to form an ionic complex. In the reaction of compounds (a) and (b), the compound (a) forms a cation formally having a coordination number that is one less than its valence, and the compound (b) becomes a non-coordinating, compatible anion.

Borane chain transfer agents that are suitable for use in this invention include borane compounds containing a B—H group as shown below:

where R and R' are the same or different linear or branched alkyl group or cycloalkyl group having from 1 to 15 carbon atoms or where R and R' together form a cyclic structure, such as where the borane is 9-BBN (9-borobicyclo[3,3,1] nonane). Suitable borane compounds include, for example, 9-borobicyclo[3,3,1]nonane (9-BBN), dimethyborane, diisoamylborane, dicyclohexylborane, borinane and borepane derivatives. The borane compounds usually form a dimer structure in pure hydrocarbon solvents, which is inactive in the sense that it will not undergo a hydroboration reaction with olefin monomers under polymerization conditions. It is such inactive (stable) borane dimer compounds that are the preferred borane compounds for use in this invention.

Basically, the polymerization reaction can be carried out under the conditions similar to those in conventional Ziegler-Natta and metallocene polymerizations. Thus, the polymerization may be carried out in solution and/or dispersion polymerization processes, where an inert hydrocarbon solvent, such as hexane, heptane, cyclohexane, toluene, xylene, or the like is used as the reaction diluent. In such cases, the polymerization normally would be carried out at a polymerization temperature ranging from about 0 to 120° C., preferably from 25 to 90° C.

The general formula of borane-terminated polyolefin is shown below:

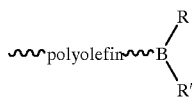

where R and R' are as described above, and wherein polyolefin is a homo-, co- or ter-polymer prepared by transition metal (especially metallocene catalyzed) coordination polymerization of at least one olefin monomer, including $C_2$–$C_{18}$ monomers with linear, branched or cyclic structures. The preferred olefin monomers include, for example, ethylene, propylene, 1-butene, 1-pentene, 1-hexene, 1-octene, 3-methyl-1-butene, 4-methyl-1-pentene, cyclopentene, norbornene, phenylnorbornene, indanylnorbornene, styrene, p-methylstyrene, 1,4-hexadiene, 1,5-hexadiene, vinylidenenorborene, divinylbenzene. These monomers can be used either singly or as a combination of two or more monomers. The resulting polyolefin stereo-structure can be anyone of the five types of tacticity known in polyolefins, including atactic, syndiotactic, isotactic, hemiisotactic and isotactic stereoblock, which are very much controlled by the catalyst used. The molecular weight of polyolefin segment typically is above about 280 g/mole, and may range between about 500 to 2,800,000 g/mole or more. In most cases, the polyolefin segment has a molecular weight of from about 500 to about 1,000,000 g/mole, e.g., from about 1,200 to about 800,000 g/mole. A preferred range is from about 10,000 to about 1,000,000 g/mole, and an even more preferred range is from about 20,000 to about 200,000 g/mole.

Formation of a borane-terminated polyolefin may be further exemplified by the polymerization of ethylene using $[Cp^*_2ZrMe]^+[MeB(C_6F_5)_3]^-$ catalyst and 9-BBN (9-borabicyclononane) chain transfer agent, where Cp* represents a pentamethylcyclopentadienyl group and Me represents a methyl group. The polymerization may be illustrated by the following general reaction scheme:

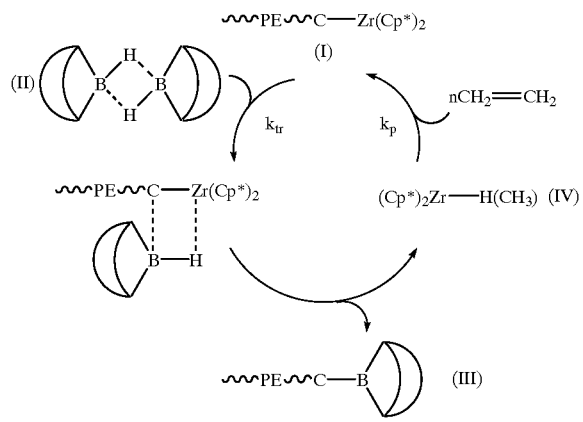

In the reaction scheme above, it will be appreciated the "C" bonded to the "Zr" represents the terminal carbon atom of the polymer chain. It will also be appreciated that represents the residue of alkyl-9-borabicyclo-(3,3,1)-nonane. During the polymerization of ethylene, the propagation Zr—C site (I) can also react with B—H moiety in 9-BBN dimmer (II) to form borane-terminated polyethylene (PE-t-B) (III) and Zr—H species (IV) which is capable of reinitiating the polymerization of ethylene to produce another polymer chain. Overall, the chain transfer reaction does not effect the rate of polymerization, but reduces the molecular weight of the resulting polymer. The molecular weight of PE-t-B is almost linearly proportional to the molar ratio of [ethylene]/[borane]. It is clear that the chain transfer reaction with B—H moiety (rate constant $k_{tr}$) is the dominant termination process, which competes with the propagating reaction (rate constant $k_p$). The degree of polymerization ($X_n$) follows a simple comparative equation $X_n=k_p$[olefin]/$k_{tr}$[borane], with a chain transfer constant of $k_{tr}/k_p \sim 1/75$.

As illustrated in the following equation, wherein the carbon atom "C" that is shown bonded to the boron atom "B" represents the terminal carbon atom of the polymer chain, the borane-terminated polyolefin can be selectively oxidized and transformed to a stable polymeric radical for polymerization of free radical polymerizable monomers, such as methyl methacrylate (MMA).

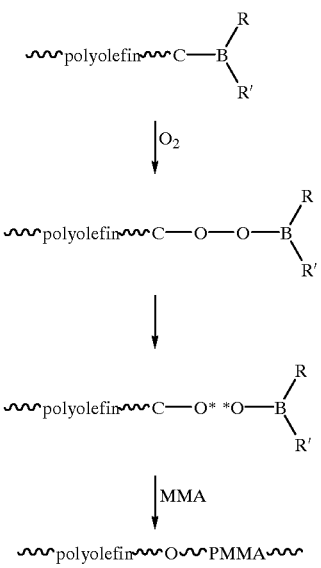

As disclosed in U.S. Pat. No. 5,401,805, with a stoichmetric amount of oxygen at ambient temperature, the terminal alkyl-9-BBN moiety is selectively oxidized at the B—C linear alkyl group located at the polymer chain end. The B—O—O—C species that is formed further decomposes at ambient temperature to a stable polymeric (C—O*) radical and a borinate radical (B—O*). The alkoxyl radical is active in initiating polymerization of polar monomers. On the other hand, the borinate radical (B—O*) is too stable to initiate polymerization due to the back-donating of electrons to the empty p-orbital of boron. However, this "dormant" borinate radical may form a reversible bond with the radical at the growing chain end to prolong the lifetime of the propagating radical. Overall, the reaction process resembles a transformation reaction from metallocene coordination polymerization to living free radical polymerization via a borane group at the polymer chain end.

As the radical polymerizable monomer to be used in the chain extension reaction, those well known in the art can be used. However, specific examples of radical polymerizable monomers that may be used in this invention include methyl methacrylate, ethyl methacrylate, butyl methacrylate, octyl methacylate, methacrylic acid, methyl acrylate, ethyl acrylate, butyl acrylate, octyl acylate, 2-hydroxyethyl acrylate, glycidyl acrylate, acrylic acid, maleic anhydride, vinyl acetate, acrylonitrile, acrylamide, vinyl chloride, vinyl fluoride, vinylidenedifluoride, tertrafluoroethylene, styrene, alpha-methyl styrene, trimethoxyvinylsilane, triethoxyvinylsilane and the like. These radical polymerizable monomers may be used either singly or as a combination of two or more kinds. The temperature for the radical chain extension reaction may be in the range of −20 to 100° C., preferably of 0 to 50° C. The polymerization time is in the range of 10 minutes to 30 hours, preferably 1 to 15 hours.

The resulting polyolefin diblock copolymers may be represented by the following formula:

$$-(M_1)_x-O-(M_2)_y$$

where $(M_1)_x$ represents a transition metal catalyzed polyolefin segment, $(M_2)_y$ represents a free radical polymerized polymer segment, x represents the number of repeating monomer units in the polyolefin segment and is between 10 and 100,000, preferably between 20 and 30,000, and most preferably between 50 and 10,000, and y represents the number of repeating units in the free radical polymerized segment and is between 1 and 100,000, preferably between 1 and 10,000, and most preferably between 1 and 5,000.

In accordance with another aspect of the present invention, there are produced polyolefin diblock copolymrs, which range from elastomeric to thermoplastic in nature, and which are particularly useful as interface modifiers for improving adhesion of polyolefins to substrates and as compatibilizers in polyolefin blends and composites. In still another aspect of this invention, there is provided a method for compatibilizing otherwise incompatible binary mixtures of (a) a polyolefin, prepared by transition metal coordination polymerization of alpha-olefins, such as ethylene, 1-propene, 1-butene, 1-pentene, 1-hexene, 1-octene, styrene and their mixtures, and (b) a functional polymer, such as acrylic polymers, methacrylic polymers, polyvinyl acetate, polyvinyl chloride, polyacrylonitrile, polyesters, polyamides, polyimides, polyethers, polyurethanes, cellulose polymers, which method comprises mixing the polyolefin (a) and the functional polymer (b) with a compatibilizing amount of a polyolefin diblock copolymer prepared in accordance with this invention. In most cases the polyolefin diblock copolymer would be added to the mixture of polyolefin (a) and functional polymer (b) in an amount of from about 0.5 to about 15% by weight, e.g., from 1 to 5% by weight, based on the total weight of (a), (b) and the diblock copolymer.

The following examples are illustrative of the principles and practice of this invention.

EXAMPLE 1

Synthesis of Borane-terminated PE by The Combination of $[Cp_2*ZrMe]^+[MeB(C_6F_5)_3]^-$ Catalyst and 9-BBN Chain Transfer Agent To a parr 450 ml stainless autoclave equipped with a mechanical stirrer, 100 ml of anhydrous/anaerobic toluene and 3 mmol of 9-BBN were charged under argon flow. The reactor was then purged with ethylene gas (~1 atm) to saturate the solution at ambient temperature. About 0.3 mmol of $[Cp_2*ZrMe]^+[MeB(C_6F_5)_3]^-$ catalyst (Cp*=pentamethylcyclopentadienyl) in toluene solution was then syringed into the rapidly stirred ethylene/9-BBN solution under ethylene pressure to initiate polymerization. Additional ethylene was fed continuously into the reactor to maintain a constant pressure of 1 atm during the entire course of the polymerization. To minimize mass-transfer and to maintain a constant comonomer feed ratio, the reactions were carried out by rapid mixing and short reaction time. After a three minutes reaction time, the polymer solution was quenched with anhydrous/anaerobic methyl alcohol (MeOH), and the resulting borane-terminated polyethylene (PE-t-B) was washed with anhydrous/anaerobic tetrahydrofuran (THF) to remove excess 9-BBN and then dried at 50° C., in a high-vacuum line. About 2.01 grams of PE-t-B were obtained with a catalytic activity of 1333 kg of PE/mol of catalyst.atm.h.

A portion of the PE-t-B polymer was oxidized by NaOH/$H_2O_2$ to form a hydroxy-terminated polymer (PE-t-OH). The PE-t-OH was analyzed by $^1H$ and $^{13}C$ NMR and GPC techniques. The GPC curve indicated a polymer molecular weight of $76 \times 10^3$ g/mole with a polydispersity index Mw/Mn=2.4. The $^1H$ NMR spectra indicated a major chemical shift at 1.30 ppm, corresponding to —$CH_2$— in the PE backbone, and several weak peaks at 0.97 ppm (chain end —$CH_3$), 1.58 ppm (—$CH_2CH_2$—OH), 2.25 ppm (—OH), 3.62 ppm (—$CH_2$—OH). A peak intensity ratio of OH:$CH_2$—O:$CH_3$=1:2:3 (±2%) was observed, indicating the exclusive production of hydroxy-terminated polyethylene. There was no detectable vinyl group associated with the conventional chain transfer process (via β-H elimination). The same results were observed in the $^{13}C$ NMR spectra with the chemical shifts corresponding to —$CH_2$—OH (δ62.99) and chain end —$CH_3$ (δ13.85) groups. These findings strongly indicate the in situ chain transfer to 9-BBN moiety during the catalytic polymerization of ethylene. The results of this example are set forth in Table 1.

EXAMPLES 2–7

Synthesis of Borane-terminated PE by The Combination of $[Cp_2*ZrMe]^+[MeB(C_6F_5)_3]^-$ Catalyst and 9-BBN Chain Transfer Agent In a series of Examples, a systematic study was conducted to evaluate the effect of changing the concentration of 9-BBN chain transfer agent on the molecular weight of the resulting borane-terminated PE polymers. Each example was carried out using the reaction procedures described in Example 1, except that the quantity of 9-BBN chain transfer agent was changed. The 9-BBN concentration used in each example is indicated in Table 1. The molecular weight (with molecular weight distribution) and structure for the PE-t-OH polymer for each example was determined by GPC and $^1H$ NMR, respectively. The results of Examples 2–7 are set forth in Table 1, along with the results of Example 1.

TABLE 1

Metallocene-Activated Ethylene Polymerization in the Presence of 9-BBN as Chain Transfer Agent.

| Ex. No. | catalyst | 9-BBN (mM) | Reaction Time (min) | Yield (g) | activity (kg of PE/mol of catalyst. atm.h) | $M_n$ (×10$^{-3}$) | Mw/Mn |
|---|---|---|---|---|---|---|---|
| 1 | $[Cp*_2ZrMe]^+[MeB(C_6F_5)_3]^-$ | 3.0 | 3 | 2.01 | 1333 | 76.0 | 2.4 |
| 2 | $[Cp*_2ZrMe]^+[MeB(C_6F_5)_3]^-$ | 4.5 | 3 | 2.05 | 1366 | 55.5 | 2.9 |

TABLE 1-continued

Metallocene-Activated Ethylene Polymerization in the Presence of 9-BBN as Chain Transfer Agent.

| Ex. No. | catalyst | 9-BBN (mM) | Reaction Time (min) | Yield (g) | activity (kg of PE/mol of catalyst. atm.h) | $M_n$ ($\times 10^{-3}$) | Mw/Mn |
|---|---|---|---|---|---|---|---|
| 3 | [CP*$_2$ZrMe]$^+$[MeB(C$_6$F$_5$)$_3$]$^-$ | 7.5 | 3 | 1.45 | 1033 | 42.2 | 2.6 |
| 4 | [Cp*$_2$ZrMe]$^+$[MeB(C$_6$F$_5$)$_3$]$^-$ | 7.5 | 5 | 2.02 | 1333 | 45.8 | 2.6 |
| 5 | [Cp*$_2$ZrMe]$^+$[MeB(C$_6$F$_5$)$_3$]$^-$ | 12.0 | 3 | 1.20 | 800 | 19.4 | 2.7 |
| 6 | [Cp*$_2$ZrMe]$^+$[MeB(C$_6$F$_5$)$_3$]$^-$ | 18.0 | 3 | 0.75 | 500 | 8.9 | 3.2 |
| 7 | [Cp*$_2$ZrMe]$^+$[MeB(C$_6$F$_5$)$_3$]$^-$ | 23.4 | 3 | 0.25 | 167 | 3.7 | 4.0 |

Cp* = $\eta^5$-Me$_5$C$_5$; catalyst concentration = 0.3mM; ethylene pressure = 1 atm; [ethylene] = 0.11 M.

Comparing the results of Examples 1–7, the polymer (PE-t-OH) molecular weight was almost linearly proportional to the molar ratio of [ethylene]/[9-BBN]. It is clear that the chain transfer reaction to 9-BBN (with rate constant $k_{tr}$) is the dominant termination process, which petes with the propagating reaction (with rate constant $k_p$). The degree of polymerization ($X_n$) follows a simple comparative equation $X_n = k_p$[olefin]/$k_{tr}$[9-BBN], with a chain transfer constant $k_{tr}/k_p \sim 1/75$.

EXAMPLE 8

Synthesis of Borane-terminated PE by The Combination of [Cp$_2$*ZrMe]$^+$[B(C$_6$F$_5$)$_4$]$^-$ Catalyst and 9-BBN Chain Transfer Agent To a parr 450 ml stainless autoclave equipped with a mechanical stirrer, 100 ml of anhydrous/anaerobic toluene and 4.5 mmol of 9-BBN were placed under argon flow. The reactor was then purged with ethylene gas (~1 atm) to saturate the solution at ambient temperature. About 0.3 mmol of [Cp$_2$*ZrMe]$^+$[B(CFF$_5$)$_4$]$^-$ catalyst in toluene solution was then syringed into the rapidly stirried ethylene/9-BBN solution under ethylene pressure to initiate the polymerization. Additional ethylene was fed continuously into the reactor to maintain a constant pressure of 1 atm during the entire course of the polymerization. After a three minutes reaction time, the polymer solution was quenched with anhydrous/anaerobic MeOH, and the resulting borane-terminated polyethylene (PE-t-B) was washed with anhydrous/anaerobic THF to remove excess 9-BBN, and then dried at 50° C., in a high-vacuum line. About 2 grams of borane-terminated polyethylene were obtained with the catalytic activity of 1333 kg of PE/mol of catalyst.atm.h. For GPC measurement, some of the PE-t-B polymer was oxidized by NaOH/H$_2$O$_2$ to form a hydroxy-terminated polymer (PE-t-OH). The polymer molecular weight was determined to be 59.4×10$^3$ g/mole, with a polydispersity index Mw/Mn=2.6.

EXAMPLE 9

Synthesis of Borane-terminated PE by The Combination of [Cp$_2$*ZrMe]$^+$[B(C$_6$F$_5$)$_4$]$^-$ Catalyst and 9-BBN Chain Transfer Agent The procedure of Example 8 was followed, except that 7.5 mmol of 9-BBN chain transfer agent was used instead of 4.5 mmol. About 1.51 grams of borane-terminated polyethylene was obtained with the catalytic activity of 1000 kg of PE/mol of catalyst.atm.h. As expected, the increased amount of 9-BBN used in the polymerization resulted in a decrease in the molecular weight of the polymer (PE-t-OH) (the molecular weight was reduced to 46.2×10$^3$ g/mole; the polydispersity index was Mw/Mn=2.5).

EXAMPLE 10

Synthesis of Borane-terminated PE by The Combination of [Cp$_2$ZrMe]$^+$[MeB(C$_6$F$_5$)$_3$]$^-$ Catalyst and 9-BBN Chain Transfer Agent To a parr 450 ml stainless autoclave equipped with a mechanical stirrer, 100 ml of anhydrous/anaerobic toluene and 7.5 mmol of 9-BBN were placed under argon flow. The reactor was then purged with ethylene gas (~1 atm) to saturate the solution at ambient temperature. About 0.3 mmol of [Cp$_2$ZrMe]$^+$[MeB(C$_6$F$_5$)$_3$]$^-$ catalyst in toluene solution was then syringed into the rapidly stirred ethylene/9-BBN solution under ethylene pressure to initiate the polymerization. Additional ethylene was fed continuously into the reactor to maintain a constant pressure of 1 atm during the entire course of the polymerization. After a three minutes reaction time, the polymer solution was quenched with anhydrous/anaerobic MeOH, and the resulting borane-terminated polyethylene (PE-t-B) was washed with anhydrous/anaerobic THF to remove excess 9-BBN and then dried at 50° C., in a high-vacuum line. About 2.5 grams of borane-terminated polyethylene was obtained with the catalytic activity of 1667 kg of PE/mol of catalyst.atm.h. For GPC measurement, some of the PE-t-B polymer was oxidized by NaOH/H$_2$O$_2$ to form a hydroxy-terminated polymer (PE-t-OH). The polymer molecular weight was determined to be 46.9×10$^3$ g/mole, with polydispersity index Mw/Mn=2.1.

EXAMPLE 11

Synthesis of Borane-terminated PE by The Combination of [Ind$_2$ZrMe]$^+$[MeB(C$_6$F$_5$)$_3$]$^-$ Catalyst and 9-BBN Chain Transfer Agent To a parr 450 ml stainless autoclave equipped with a mechanical stirrer, 100 ml of anhydrous/anaerobic toluene and 7.5 mmol of 9-BBN were placed under argon flow. The reactor was then purged with ethylene gas (~1 atm) to saturate the solution at ambient temperature. About 0.3 mmol of [Ind$_2$ZrMe]$^+$[MeB(C$_6$F$_5)_3$]$^-$ catalyst in toluene solution (Ind=Indenyl) was then syringed into the rapidly stirred ethylene/9-BBN solution under ethylene pressure to initiate the polymerization. Additional ethylene was fed continuously into the reactor to maintain a constant pressure of 1 atm during the entire course of the polymerization. After a three minutes reaction time, the polymer solution was quenched with anhydrous/anaerobic MeOH, and the resulting borane-terminated polyethylene (PE-t-B) was washed with anhydrous/anaerobic THF to remove excess 9-BBN, and then dried at 50° C., in a high-vacuum line. About 1.9 grams of borane-terminated polyethylene was obtained with the catalytic activity of 1267 kg of PE/mol of catalyst.atm.h. For GPC measurement, some of the PE-t-B polymer was oxidized by $NaOH/H_2O_2$ to form a hydroxy-terminated polymer (PE-t-OH). The polymer molecular weight was determined to be $43.9 \times 10^3$ g/mole with the polydispersity index Mw/Mn=2.3.

EXAMPLE 12

Synthesis of Borane-terminated s-PS by The Combination of $[Cp*TiMe_2]^+[MeB(C_6F_5)_3]^-$ Catalyst and 9-BBN Chain Transfer Agent A 50 ml glass reactor, equipped with a magnetic stirrer, was charged with 10 ml of anhydrous/anaerobic styrene and 25 μmol of 9-BBN under ultra-high purified argon. About 10 μmol of $[Cp*TiMe_2]^+[MeB(C_6F_5)_3]^-$ catalyst in toluene was then syringed into the rapidly stirred styrene/9-BNN mixture at 25° C., After 3 minutes, the reaction was quenched by anhydrous/anaerobic MeOH, and the reaction products were filtered and washed with anhydrous/anaerobic THF to remove excess 9-BBN. The polymer was then dried at 50° C., in high-vacuum line for 2 hours to obtain 1.3 grams of the borane-terminated syndiotactic polystyrene (s-PS-t-B). The catalytic activity was 2600 kg of PS/(mol of catalyst.h). For easy handling of analytic samples, some of the s-PS-t-B polymer was oxidized by $NaOH/H_2O_2$ to form a hydroxy-terminated polymer (s-PS-t-OH). The combination of $^1H$ and $^{13}C$ NMR, DSC (differential scanning calorimetry) and GPC measurements indicated the s-PS-t-OH to have a 97% syndiotactic index, a melting point at 270° C., a molecular weight of $Mn=230 \times 10^3$ g/mole, and a polydispersity index Mw/Mn=2.0. The results for this example are set forth in Table 2.

EXAMPLES 13–18

Synthesis of Borane-terminated s-PS by The Combination of $[Cp*TiMe_2]^+[MeB(C_6F_5)_3]^-$ Catalyst and 9-BBN Chain Transfer Agent In a series of Examples, a systematic study was conducted to evaluate the effect on the molecular weight of resulting borane-terminated s-PS polymers of changing the concentration of 9-BBN chain transfer agent. Each example was carried out using the reaction procedure described in Example 12, except that the quantity of 9-BBN chain transfer agent was changed, as indicated in Table 2. In general, most of the polymerization reactions were very effective to produce borane-terminated s-PS polymers. Table 2 summarizes the polymerization conditions and results. The polymer structure, thermal transition temperature and molecular weight (with molecular weight distribution) were determined by $^1H$ NMR, DSC and GP, respectively.

TABLE 2

Metallocene-Activated Styrene Syndiospecific Polymerization in the Presence of 9-BBN as Chain Transfer Agent.

| run | 9-BBN (μmol) | Reaction time (min) | yield (g) | Catalyst Activity | Syndio-Tactic Index | $T_m$ (° C.) | Mn (g/mol) | Mw/Mn |
|---|---|---|---|---|---|---|---|---|
| 12 | 25 | 3 | 1.3 | 2600 | 97.0 | 270 | 230000 | 2.0 |
| 13 | 50 | 3 | 1.4 | 2800 | 96.2 | 271 | 120000 | 2.0 |
| 14 | 100 | 3 | 1.3 | 2600 | 95.8 | 270 | 75000 | 2.1 |
| 15 | 150 | 3 | 1.1 | 2200 | 95.2 | 271 | 40000 | 2.0 |
| 15 | 200 | 3 | 0.8 | 1600 | 93.4 | 270 | 35000 | 2.0 |
| 17 | 300 | 3 | 0.5 | 1000 | 94.7 | 272 | 15000 | 2.2 |
| 18 | 400 | 3 | 0.3 | 600 | 95.0 | 270 | 7500 | 2.3 |

Styrene = 10 mL; catalyst = $[Cp*TiMe_2]^+[Me(B(C_6F_5)_3]^-$; catalyst concentration = 10 μmol; catalyst activity = kg of s-PS/mol of catalyst.h.

All of the s-PS-t-OH polymer samples showed high syndiotacticity, and a high melting point. The narrow molecular distribution observed for each sample indicates a single active site operated during each polymerization reaction; and the polymer molecular weight was almost linearly proportional to the molar ratio of [styrene]/[9-BBN]. It is clear that the chain transfer reaction to 9-BBN (with rate constant $k_{tr}$) wss the dominant termination process, which competed with the propagating reaction (with rate constant $k_p$). The degree of polymerization ($X_n$) followed a simple comparative equation $X_n = k_p[styrene]/k_{tr}[9\text{-BBN}]$.

EXAMPLE 19

Synthesis of Poly(ethylene-b-methyl methacrylate) (PE-b-PMMA)

In a glove box with argon atmosphere, 9-BBN-terminated polyethylene (3 g) (Mn=19400 g/mol; Mw/Mn=2.0), prepared by the procedure shown in Example 1, was mixed with methyl methacrylate monomer (18.7 g) and 80 mL of anhydrous/anaerobic benzene solvent in a septum-capped 250 mL glass flask equipped with a high-vacuum stopcock and a magnetic stirring bar. The sealed flask was removed from the glove box, and the free radical polymerization reaction was initiated by injecting a measured amount of $O_2$ (1.9 mL) into the reaction flask at room temperature. After a measured time interval (24 h), the polymerization reaction was terminated by adding 50 mL of methanol. The polymer was collected by filtration and then washed with methanol and THF, followed by drying under vacuum at 60° C., The dried polymer was extracted with boiling THF to remove only trace amount of poly(methyl methacrylate) homopolymer. The insoluble fraction (which is soluble in 1,1,2,2-tetrachloroethane or 1,2,4-trichlorobenzene at elevated temperatures) was PE-b-PMMA diblock copolymer (8.05 g). The diblock polymer was analyzed by $^1H$ NMR and GPC techniques. $^1H$ NMR spectra indicated that the relative molar ratio between ethylene and MMA repeating units in each block was about 100:102, which is quite consistent with the GPC results showing the molecular weight of diblock copolymer Mn=90300 g/mol, with a disoersity index Mw/Mn=2.7. The monochromatic increase of the copolymer molecular weight, with only a slight broadening in the molecular weight distribution and no detectable PE homopolymer, clearly point to the existence of a borane group at each PE chain end and a living radical polymerization of MMA in the chain extension process.

EXAMPLES 20–33

Synthesis of Poly(ethylene-b-methyl methacrylate) (PE-b-PMMA)

A series of PE-b-PMMA diblock copolymers were prepared by following the procedure of Example 19. The starting 9-BBN-terminated polyethylene polymers were obtained in accordance with the procedure of Example 1. Table 3 summarizes the reaction conditions and results. The resulting PE-b-PMMA reaction mixtures were carefully fractionalized by Soxlet extraction using boiling THF to remove any PMMA homopolymer. At a low reaction temperature (25° C.), only a small amount of PMMA homopolymer was isolated. However, the quantity of PMMA homopolymer significantly increased with an increase in reaction temperature. The ungrafted PMMA polymer may be initiated by the radical formed in the bicyclic ring, instead of a polymeric radical, due to the non-selective oxidation reaction of alkyl-9-BBN at the end of PE chain. The insoluble fraction (which is soluble in 1,1,2,2-tetrachloroethane or 1,2,4-trichlorobenzene at elevated temperatures) was PE-b-PMMA diblock copolymer, which was analyzed by $^1$H NMR and GPC techniques.

EXAMPLE 34

Synthesis of Syndiotactic Polystyrene/poly(methyl methacrylate) Diblock Copolymers (s-PS-b-PMMA)

In a glove box, 9-BBN-terminated syndiotactic polystyrene (5 g) ($M_n$=15000 g/mol; $M_w/M_n$=2.2), prepared by the procedure of Example 12, was mixed with methyl methacrylate (18.7 g) monomer and 80 mL of anhydrous/anaerobic benzene solvent in a septum-capped 250 mL flask equipped with a high-vacuum stopcock and a magnetic stirring bar. The reaction was initiated by injecting a measured amount of $O_2$ (1.9 mL) into the reaction flask at room temperature. After a measured time interval (6 h), the reaction was quenched by the addition of 50 mL of methanol. The polymer was collected by filtration and then washed with methanol and THF, followed by drying under vacuum at 60° C., The dried polymer was extracted with boiling THF to remove poly(methyl methacrylate) homopolymer, and the diblock copolymer containing sydiotactic polystyrene block sequence was obtained in a yield of 4.25 g. The diblock polymer was analyzed by $^1$H and $^{13}$C NMR, DSC and GPC techniques. The relative molar ratio of monomer units in s-PS and PMMA blocks was observed to be 100:14. The molecular weight and thermal transition temperature of the s-PS-b-PMMA diblock copolymer were determined to be $M_n$=17000 g/mol, $T_g$=100° C., and $T_m$=270° C., respectively.

EXAMPLE 35

Synthesis of Syndiotactic Polystyrene/poly(methyl methacrylate) Diblock Copolymers (s-PS-b-PMMA)

Following the procedure of Example 34, 9-BBN-terminated syndiotactic polystyrene (5 g) ($M_n$=15000 g/mol; $M_w/M_n$=2.2) was mixed with methyl methacrylate (18.7 g) monomer and 80 mL of anhydrous/anaerobic benzene solvent in a septum-capped 250 mL flask equipped with a high-vacuum stopcock and a magnetic stirring bar. The reaction was initiated by injecting a measured amount of $O_2$ (1.4 mL) into the reaction flask at room temperature. After a measured time interval (12 h), the reaction was quenched by the addition of 50 mL of methanol. The polymer was collected by filtration and then washed with methanol and THF, followed by drying under vacuum at 60° C. After solvent extraction of poly(methyl methacrylate) homopolymer by boiling THF, 5.56 g of s-PS-b-PMMA diblock copolymer was obtained. The molar ratio of monomer units in the s-PS and PMMA blocks was determined to be 100:35. The molecular weight and thermal transition temperatures of the s-PS-b-PMMA diblock copolymer were found to be $M_n$=20000 g/mol, $T_{g1}$=100° C., $T_{g2}$=120° C., and $T_m$=270° C., respectively.

EXAMPLE 36

Synthesis of Syndiotactic Polystyrene/poly(methyl methacrylate) Diblock Copolymers (s-PS-b-PMMA)

The procedure of Example 35 was repeated, except that the reaction was quenched with methanol after 24 h, instead of after 12 h. The polymer was collected by filtration and then washed with methanol and THF, followed by drying under vacuum at 60° C., After solvent extraction of poly (methyl methacrylate) homopolymer by boiling THF, 7.56 g of s-PS-b-PMMA diblock copolymer was obtained. The molar ratio of monomer units in s-PS and PMMA blocks was determined to be 100:97. The molecular weight and thermal transition temperatures of the s-PS-b-PMMA diblock copolymer were found to be $M_n$=29000 g/mol, $T_{g1}$=100° C., $T_{g2}$=120° C., and $T_m$=270° C., respectively.

What is claimed is:

1. A process for preparing polyolefin diblock copolymer containing a transition metal prepared polyolefin segment and a free radical prepared polymer segment, which comprises the steps of:

(a) contacting at least one $C_2$–$C_{18}$ linear, branched or cyclic aliphatic or aromatic olefin under transition metal-catalyzed polymerization reaction conditions while in the presence of a borane dimer compound chain transfer agent and in the further presence of a transition metal catalyst/co-catalyst having a non-coordinated anion to form a borane-terminated polyolefin in situ by a B—H transformation reaction that occurs during a transition metal catalyzed olefin polymerization reaction;

(b) oxidizing the borane group on the borane-terminated polyolefin formed in step (a) to convert the borane-terminated polyolefin to a stable free radical polymer capable of initiating free radical polymerization; and (c) adding at least one free radical polymerizable monomer to the reaction mixture from step (b) to initiate a living free radical polymerization reaction via said free radical polymer and to thereby form a polyolefin diblock copolymer comprising a polyolefin segment linked to a free radical polymerized segment via an ether linkage.

2. The process of claim 1, wherein said olefin is selected from the group consisting of ethylene, propylene, 1-butene, 1-pentene, 1-hexene, 1-octene, 3-methyl-1-butene, 4-methyl-1-petene, cyclopentene, norbornene, phenylnorbornene, indanylnorbornene, styrene, p-methylstyrene, butadiene, 1,4-hexadiene, 1,5-hexadiene, vinylidenenorborene, divinylbenzene and mixtures thereof.

3. The process of claim 1, wherein said free radical polymerizable monomer is selected from the group consisting of methyl methacrylate, ethyl methacrylate, butyl methacrylate, octyl methacylate, methacrylic acid, methyl acrylate, ethyl acrylate, butyl acrylate, octyl acylate, 2-hydroxyethyl acrylate, glycidyl acrylate, acrylic acid, maleic anhydride, vinyl acetate, acrylonitrile, acrylamide, vinyl chloride, vinyl fluoride, vinylidenedifluoride, tertrafluoroethylene, styrene, alpha-methyl styrene, trimethoxyvinylsilane, triethoxyvinylsilane and mixtures thereof.

4. The process of claim 1, wherein said polyolefin diblock copolymer is represented by the formula

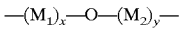

where $(M_1)_x$ represents a transition metal catalyzed polyolefin segment, $(M_2)_y$ represents a free radical polymerized polymer segment, x represents the number of repeating monomer units in the polyolefin segment and is between 10 and 100,000, and y represents the number of repeating units in the free radical polymerized segment and is between 1 and 100,000.

5. The process of claim 4, wherein x is between 50 and 30,000 and y is between 1 and 10,000.

6. The process of claim 4, wherein x is between 20 and 10,000 and y is between 1 and 5,000.

7. The process of claim 1, wherein said transition metal catalyst/co-catalyst comprises an active ionic complex having the formula:

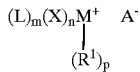

wherein L is a ligand selected from the group consisting of cyclopentadienyl, substituted cyclopentadienyl, amido, phosphido, bulky alpha-diimine group, bridged ligands having a covalent bridging group between two ligands; X is a halogen; $R^1$ is a hydrocarbyl group or hydrocarboxy having from 1 to 20 carbon atoms; m=1–3; n=0–2; p=1–2; M is a transition metal selected from groups IIIB to VIIB and VIII of the Periodic Table; and $A^-$ is a non-coordinating, compatible anion.

8. The process of claim 7, wherein $A^-$ is selected from tetraphenylborate, tetrakis(pentafluorophenyl)borate and methyltri(pentafluorophenyl)borate.

9. The process of claim 1, wherein said transition metal catalyst/co-catalyst is a metallocene complex of a metal selected from the group consisting of titanium, zirconium and hafnium, and a non-coordinating borate anion selected from the group consisting of tetraphenylborate, tetrakis (pentafluorophenyl)borate and methyltri(pentafluorophenyl) borate.

10. The process of claim 1, wherein said borane dimer compound is the dimer of 9-borobicyclo[3,3,1]nonane (9-BBN).

11. The process of claim 1, wherein said borane dimer compound is the dimer of a borane compound selected from the group consisting of dimethyborane, diisoamylborane, dicyclohexylborane, borinane and borepane derivatives.

12. The process of claim 1, wherein the step (a) is performed in the presence of a pure hydrocarbon diluent selected from the group consisting of hexane, cyclohexane, heptane, benzene, xylene, toluene and mixtures thereof.

13. The process of claim 4, wherein the monomer used to prepare the polyolefin segment is selected from the group consisting of ethylene, propylene, 1-butene, 1-octene, 1,4-hexadiene, 1,5-hexadiene, vinylidenenorborene, styrene, p-methylstyrene, divinylbenzene and mixtures thereof.

14. The process of claim 4, wherein the monomer used to prepare the polyolefin segment is selected from the group consisting of cyclopentene, norbornene, phenylnorbornene, indanylnorbornene, and mixtures thereof.

15. The process of claim 4, wherein the polyolefin segment has an isotactic, syndiotactic, atactic, hemiisotactic or isotactic stereoblock structure.

16. The process of claim 15, wherein the polyolefin segment is isotactic polypropylene.

17. The process of claim 15, wherein the polyolefin segment is syndiotactic polystyrene.

18. The process of claim 15, wherein the polyolefin segment is poly(norbornene).

19. The process of claim 15, wherein the polyolefin segment is poly(cyclopentene).

20. The process of claim 15, wherein the polyolefin segment is an elastomer composed of at least two or more monomers chosen from the group consisting of ethylene, propylene, 1-butene, 1-octene, 1,4-hexadiene, 1,5-hexadiene, vinylidenenorborene, styrene, p-methylstyrene and divinylbenzene.

21. The process of claim 4, wherein the monomer is used to prepare the radical polymerized polymer segment is selected from the group consisting of methacrylate monomers, acrylate monomers and mixtures thereof.

22. The process of claim 4, wherein the monomer is used to prepare the radical polymerized polymer segment is selected from the group consisting of maleic anhydride and styrene/maleic anhydride mixtures.

* * * * *